Sept. 3, 1957 M. B. MENTLEY ET AL 2,804,734
MACHINE FOR GRINDING THE TOOTHED SURFACES OF GEARS
Filed June 14, 1954
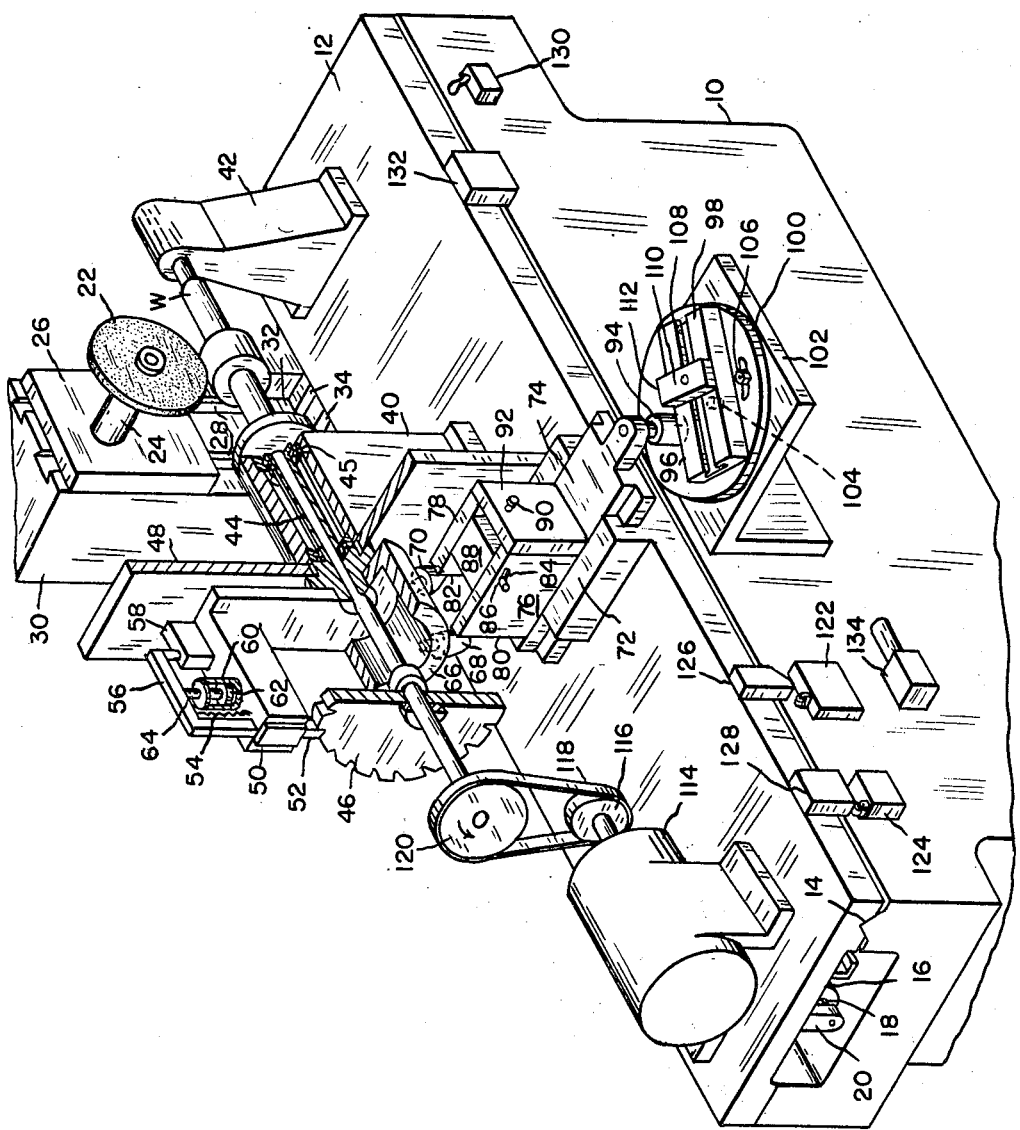
INVENTORS
MAX B. MENTLEY
ARTHUR B. BASSOFF
BY Whittemore, Hulbert
& Belknap ATTORNEYS

United States Patent Office 2,804,734
Patented Sept. 3, 1957

2,804,734

MACHINE FOR GRINDING THE TOOTHED SURFACES OF GEARS

Max B. Mentley and Arthur B. Bassoff, Detroit, Mich., assignors to National Broach & Machine Company, Detroit, Mich., a corporation of Michigan Application June 14, 1954, Serial No. 436,362

6 Claims. (Cl. 51—232)

The present invention relates to a machine for grinding the toothed surfaces of gears.

It is an object of the present invention to provide a machine adapted to grind involute tooth surfaces either modified or unmodified, on either spur or helical gears.

It is a further object of the present invention to provide in a gear grinding machine, means for effecting controlled rotation of a gear supporting spindle in accordance with axial traverse thereof.

It is a feature of the present invention to provide mechanism associated with the work spindle of a gear grinding machine comprising at least a pair of elements having involute surfaces thereon disposed at a distance from the axis of the work spindle equal to the radius of the base cylinder of the involute surfaces, the elements being spaced both axially and angularly with respect to the axis of the work spindle, in combination with a pair of members having plane surfaces engaging the involute surfaces of said elements, and means for effecting movement of said members in a plane perpendicular to the axis of said work spindle proportional to axial movement of said work spindle.

It is a further feature of the present invention to provide in apparatus as described in the preceding paragraph, means for effecting relative adjustment between said members in a direction parallel to the path of movement thereof.

It is a further feature of the present invention to provide in apparatus of the character described, sine bar mechanism including a sine bar and follower, and a modification cam carried by said sine bar having a portion thereof extending beyond the surface of the sine bar engaged by said follower.

Other objects and features of the invention will become apparent as the description proceeds, especially when taken in conjunction with the accompanying drawings, wherein the figure is a perspective view of a gear grinding machine embodying the present invention, with parts broken away.

The gear grinding machine comprises a base 10 having a slide 12 mounted on ways 14 for longitudinal reciprocation, suitable means being provided to effect controlled reciprocation of the slide. This means is indicated by a cylinder 16 carried by the base having a piston therein connected to a piston rod 18, which in turn is connected to a lug 20 depending from one end of the slide 12.

At one side of the base 10 there is provided means for supporting a grinding wheel for vertical movement, for angular adjustment in a horizontal plane, and for horizontal movement toward and away from the axis of the work spindle. The grinding wheel is illustrated at 22 mounted on a spindle 24 carried by a vertically adjustable support plate 26, this plate being mounted for vertical adjustment in ways 28 on a column 30 mounted for angular adjustment about a vertical axis on a sub-plate 32 which in turn is mounted for horizontal movement toward and away from the axis of the work spindle, ways for such movement being indicated at 34. The vertical axis about which the column 30 is adjustable is located in the plane of the grinding wheel 22.

Mounted on the main slide 12 is a headstock support 40 and a tail stock support 42 between which the work gear W is mounted for rotation. Suitable means are provided for connecting the work gear W to a work spindle 44 mounted for rotation in suitable bearings 45. Keyed or otherwise secured to the work spindle 44 is an index plate or disc 46 and mounted for rotation in a headstock plate 48 is a device 50 which includes a movable ratchet engaging pawl 52, normally biased downwardly into engagement with a notch on the ratchet wheel by a tension spring 54. Connected to the pawl 52 is an arm 56 adapted to overlie and cooperate with a switch 58. Means are also provided for effecting release movement of the pawl and this means comprises an air cylinder 60 having a piston 62 therein provided with a piston rod 64 engageable with the underside of the arm 56. The device 50 also includes a base cylinder portion 66 having a pair of elements 68 and 70 therein each of which is provided with an involute surface. In practice it is desired to make the elements 68 and 70 in the form of involute surfaces of revolution resembling acorns, and the base cylinder portion 66 carrying the elements 68 and 70 has an outer radius equal to the base radius of the involutes of the surfaces of the elements 68 and 70. In addition, elements 68 and 70 are spaced both axially and angularly with respect to the axis of the work spindle 44.

Mounted on the slide 12 in rectilinear guides 72 is a cross slide 74 having a pair of members 76 and 78 carried thereby. The members 76 and 78 each are provided with plane surfaces 80 and 82 which engage respectively with the involute surface portions of the elements 68 and 70. Means are provided for relatively adjusting the members 76 and 78, this means being illustrated as comprising elongated slots 84 through which clamping elements 86 extend into an intermediate block 88. An adjusting screw 90 is associated with a backing plate 92 and its inner portion engages the block 88 and is adapted to effect adjustment of the block and of both the members 76 and 78 with respect to the cross slide 74. From the foregoing described construction it will be noted that the involute engaging surfaces 80 and 82 of the members 76 and 78 are adjustable relative to each other and are further, adjustable as a unit in a direction parallel to the direction of motion of the cross slide 74.

At its outer end the cross slide 74 is provided with a follower 94 adapted to engage a plane surface 96 of a sine bar 98 mounted for angular adjustment on a mounting disc 100 pivotally connected to a bracket 102 carried at one side of the base 10, the mounting disc being angularly adjustable about a pivot pin 104 and adapted to be locked in adjusted position by a lock screw 106.

The sine bar 98 is provided with a longitudinally extending T-slot 108 and mounted for longitudinal adjustment therealong is a modification cam 110 having a surface 112 adapted to extend beyond the plane surface 96 of the sine bar in position to engage the surface of the follower 94.

Mounted on the slide 12 is a torque motor 114 having a pulley 116 adapted to be connected by a belt 118 to a pulley 120 keyed or otherwise secured to the work spindle 44. The torque motor is adapted to be energized in a direction to tend to rotate the work spindle 44 in the direction of the arrow so as to maintain the involute surfaces of the elements 68 and 70 in contact respectively with the plane surfaces 80 and 82 of the members 76 and 78.

Mounted on the base 10 are switches 122 and 124 and carried by the slide 12 are switch actuators 126 and 128 which are adapted to be adjusted longitudinally of the slide and to actuate the switches 122 and 124 at the proper point in traverse of the slide. If desired, an additional switch 130 and switch actuator 132 may be provided.

An air valve 134 is provided and is connected to the switch 122 so that when the switch 122 is operated by switch actuator 126, the valve 134 admits air to the cylinder 60 for a brief instant, urging the piston 62 upwardly and retracting the pawl 52 from a notch of the index disc 46. This upward movement of the pawl results in actuation of switch 58 which is interconnected with switch 124 so as to delay reversing of the slide 12 until arm 56 has again moved downwardly as permitted by engagement of the pawl 52 with the next succeeding notch of the index disc 46. Switch 124 is suitably connected to a valve for controlling the admission of fluid to the power cylinder 16 which reciprocates the slide 12. Accordingly, with the structure just described, the slide 12 reciprocates and at the completion of each reciprocation the gear W is indexed one notch of the index disc 46, rotation being imparted to the index disc by the torque motor 114. It will be understood that the brief application of pressure to the cylinder 60 is merely sufficient to lift the pawl 52 out of a recess and then to release it to bear against the outside diameter of the disc 46 until the disc rotates by an increment of one notch.

The sine bar 98 may be angularly adjusted to a suitable angle so as to produce movement of the cross slide 74 which is proportional to movement of the main slide 12. The engagement between the plane surfaces 80 and 82 of the members 76 and 78 with the involute surfaces of the elements 68 and 70 produces rotational movement of the work spindle which is proportional to movement of the cross slide 74, and hence which is proportional to movement of the main slide 12. Accordingly, with the grinding wheel 22 set in the proper position and with the sine bar 98 set at the proper angularity, reciprocation of the slide 12 causes proper rotation of the work piece W to permit grinding of true helical surfaces on teeth on the work piece.

In many cases it is desirable to produce a longitudinal modification on the surfaces of the work teeth. This is most conveniently accomplished by employing a grinding wheel 22 having its periphery trimmed to the proper involute configuration, and by having the grinding wheel offset from a position directly above the work piece W. In this so-called off-center position the trimmed surface of the grinding wheel is most advantageously disposed to permit axial modification of the tooth surface. The particular modification of the tooth surface may for example be in the form of a convex crown resulting in teeth, if finished uniformly on both sides, which are relatively thicker at their central portions than at their end portions. Other modifications may of course be produced, such for example, modifications known as "high involute" or "low involute." These modifications are most advantageously produced by the provision of the modification cam 110 adjustably mounted for movement along the ways 108 on the sine bar 98. The surface 112 of the modification cam may be ground to the proper configuration to produce the required modification of the toothed surface.

The great advantage of the provision of two or more elements 68 and 70 in conjunction with the separate members 76 and 78 is that substantially more controlled rotation may be imparted to the work spindle during a single stroke than otherwise, and accordingly the grinder is adapted to perform grinding operations on parts of greater helix angle. Also, by the provision of the independent adjustment of the members 76 and 78, one member may be conformed exactly to its cooperating involute element so that perfectly true rotational movement of the work spindle may result without distortion as the driving effect is transferred from one element 68 to the other element 70. Obviously, of course, more than two involute elements and associated members may be employed, although two are ordinarily sufficient to give the machine the full required capacity.

In the illustrated embodiment of the present invention the surfaces 80 and 82 of the members 76 and 78 respectively are illustrated as vertical or perpendicular to the direction of advance of the cross slide 74. It will be appreciated that these surfaces may be appropriately inclined if desired and still cooperate with the involute surfaces of the elements 68 and 70 to impart uniform rotation to the work piece W during uniform axial movement thereof.

The operation of the apparatus described in the foregoing is believed obvious but for completeness it will be briefly reviewed. In the first place, the apparatus is capable of grinding either spur or helical cylindrical gears, and further, is capable of performing an on-center grinding operation in which the grinding wheel contacts opposite sides of a single tooth space, or is capable of performing an off-center grinding operation in which the grinding wheel is shifted to a position at one sde of the vertical plane passing through the axis of the gear.

If the apparatus is to be employed for grinding a spur gear in on-center relationship the grinding wheel 22 is brought into position directly above the spindle 44 with its plane extending parallel to the spindle. The sine bar 98 may be adjusted into parallelism with the direction of reciprocation of the main slide 12, or alternatively, the cam follower 94 may be removed and the cross slide 74 fixed against reciprocation as by a locating pin (not shown). The motor 114 is then energized and back and forth reciprocation of the table commences. At the end of each reciprocation air is admitted momentarily to the cylinder 60, retracting the index pawl 52 from the index plate. This permits the torque motor 114 to rotate the spindle a distance sufficient to permit the pawl 52 to drop into the next notch of the index plate. This in turn initiates the succeeding reciprocation. This cycle is repeated until all tooth spaces of the gear have been ground.

If the apparatus is to be employed for grinding helical gear teeth in an on-center grinding relationship, the operation is precisely the same except that the grinding wheel is adjusted around to the proper angle corresponding to the helix angle of the gear teeth, and sine bar 98 is adjusted to the appropriate angle to effect the required rotation of the work gear in accordance with reciprocation to generate the required lead.

Finally, if the apparatus is to be employed in an off-center grinding relationship, the operation is precisely the same except that the column 30 carrying the grinding wheel 22 is adjusted laterally to move the grinding wheel 22 out of the vertical plane passing through the axis of the gear. The slide 26 is then moved downwardly to bring the periphery of the wheel in contact with a tooth surface.

The drawings and the foregoing specification constitute a description of the improved machine for grinding the toothed surfaces of gears in such full, clear, concise and exact terms as to enable any person skilled in the art to practice the invention, the scope of which is indicated by the appended claims.

What we claim as our invention is:

1. In a machine for grinding gears, a gear supporting spindle, index and lead control mechanism for said spindle comprising an index plate secured thereto, and a device rotatable on said spindle including an index pawl movable into and out of engagement with said plate and a pair of elements having involute surfaces thereon, said elements being axially and angularly spaced relative to said spindle and being located at a distance from the axis thereof equal to the base radius of their involute surfaces, a main slide on which said spindle and index and lead control mechanism is mounted, means for reciprocating said main slide, a cross slide on said main slide, a pair of members on said cross slide having plane surface portions engageable with the involute surfaces of said elements, sine bar mechanism for effecting movement of said cross slide proportional to movement of said main slide, means effective to bias said index plate continuously in the direction required to urge said elements against the plane surface portions of said members, and means automatically operable at the end of a stroke of said main slide for effecting momentary withdrawal of said index pawl to provide indexed rotation of a gear carried by said spindle..

2. Apparatus as defined in claim 1 in which the plane surface portions of said members are perpendicular to the direction of movement of said cross slide.

3. Apparatus as defined in claim 1 in which said members are relatively adjustable on said cross slide in a direction parallel to the path of movement of said cross slide on said main slide.

4. Apparatus as defined in claim 1 in which the means for biasing said index plate comprises a torque motor.

5 In a gear grinding machine, a base, a main slide on said base, a rotary work spindle on said main slide having its axis parallel to the direction of movement of the main slide, a cross slide on said main slide, sine bar mechanism carried by said base and cross slide to effect movement of said cross slide proportional to movement of said main slide, a pair of elements having involute surfaces rigidly conneced to said spindle in axially and angularly spaced relation with respect thereto, the involute surfaces being involute of a base circle whose radius is equal to the spacing of the origins of said involutes from the axis of said spindle, a pair of camming members on said cross slide having flat parallel surfaces sequentially engageable with the involute surfaces of said elements, means for effecting relative adjustment between said camming members parallel to the direction of movement of said cross slide and means for locking said camming members in fixed adjusted relation on said cross slide.

6. Apparatus as defined in claim 5 which comprises torque mechanism for maintaining said elements in guiding contact with the cooperating surfaces of said camming members, and means for adjusting both of said camming members simultaneously with respect to said cross slide.

References Cited in the file of this patent

UNITED STATES PATENTS

| | | |
|---|---|---|
| 1,694,188 | Lewis | Dec. 4, 1928 |
| 1,870,764 | Aeppli | Aug. 9, 1932 |
| 2,066,220 | Orcutt | Dec. 29, 1936 |
| 2,136,491 | Cornell | Nov. 15, 1938 |
| 2,154,054 | Schurr | Apr. 11, 1939 |
| 2,212,855 | Chittenden | Aug. 27, 1940 |
| 2,401,561 | Gruenberg | June 4, 1946 |
| 2,452,123 | Hjelmblad | Oct. 26, 1948 |
| 2,672,716 | Mentley et al. | Mar. 23, 1954 |
| 2,686,993 | Mentley | Aug. 24, 1954 |